(12) United States Patent
Adoline et al.

(10) Patent No.: US 7,066,455 B2
(45) Date of Patent: Jun. 27, 2006

(54) SELF-CENTERING MECHANICAL STRUT

(75) Inventors: Jack W. Adoline, Toledo, OH (US); Mark R. Thomas, Toledo, OH (US); Bruce J. Fondren, Ida, MI (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/900,618

(22) Filed: Jul. 28, 2004

(65) Prior Publication Data

US 2005/0029719 A1    Feb. 10, 2005

Related U.S. Application Data

(60) Provisional application No. 60/493,513, filed on Aug. 8, 2003.

(51) Int. Cl.
*F16F 1/06* (2006.01)
*F16F 3/02* (2006.01)

(52) U.S. Cl. ............ 267/168; 267/290; 267/291; 74/470

(58) Field of Classification Search ........... 267/69–74, 267/150, 168, 166, 170–176, 4, 250, 286–291; 248/613; 74/470; 901/48; 76/490.05
See application file for complete search history.

(56) References Cited

U.S. PATENT DOCUMENTS

| | | | |
|---|---|---|---|
| 1,329,561 A * | 2/1920 | Thompson | ............. 267/290 |
| 4,126,302 A | 11/1978 | Curnutt | |
| 4,162,062 A | 7/1979 | Strauss | |
| 4,223,564 A | 9/1980 | Fawcett | |
| 4,274,515 A | 6/1981 | Boucier DeCarbon | |
| 4,328,960 A | 5/1982 | Handke et al. | |
| 4,674,769 A | 6/1987 | Ota et al. | |
| 4,962,916 A | 10/1990 | Palinkas | |
| 4,991,675 A | 2/1991 | Tosconi et al. | |
| 5,095,581 A | 3/1992 | Sarto | |
| 5,220,706 A * | 6/1993 | Bivens | ............. 16/66 |
| 5,269,562 A | 12/1993 | Peitsmeier et al. | |
| 5,390,903 A * | 2/1995 | Fidziukiewicz | ............. 267/28 |
| 5,730,239 A | 3/1998 | Holter | |
| 5,799,759 A | 9/1998 | Koch | |
| 5,810,339 A | 9/1998 | Kuspert et al. | |
| 5,820,163 A | 10/1998 | Thacker et al. | |

(Continued)

FOREIGN PATENT DOCUMENTS

FR          2 690 403 A1     10/1993

OTHER PUBLICATIONS

Patent Cooperation Treaty, International Search Report—PCT/US03/39443; Jun. 10, 2004; Form PCT/ISA/210 (second sheet) (Jul. 1998).

(Continued)

*Primary Examiner*—Robert A. Siconolfi
(74) *Attorney, Agent, or Firm*—Fay, Sharpe, Fagan, Minnich & McKee, LLP

(57) ABSTRACT

A self-centering mechanical strut has first and second housing members. The second housing member telescopically receives the first housing member. Spring assemblies are mounted within each of the housing members. The spring assembly in the first tube is compressed when the first housing is pushed into the second housing. The spring assembly in the second tube is compressed when the first housing is pulled out of the second housing. Each housing is spring-biased to return to its respective neutral position.

33 Claims, 3 Drawing Sheets

U.S. PATENT DOCUMENTS

| | | | |
|---|---|---|---|
| 5,890,556 A | 4/1999 | Shearn et al. | |
| 5,896,959 A * | 4/1999 | Jeffries et al. | 267/250 |
| 5,975,228 A | 11/1999 | Parfitt | |
| 6,220,406 B1 | 4/2001 | DeMolina et al. | |
| 6,272,945 B1 | 8/2001 | Jolley | |
| 6,467,367 B1 | 10/2002 | Kim et al. | |
| 6,474,689 B1 | 11/2002 | Mulhern et al. | |
| 6,564,667 B1 * | 5/2003 | Bayer et al. | 74/490.01 |
| 6,773,002 B1 * | 8/2004 | Adoline et al. | 267/168 |
| 2004/0113341 A1 * | 6/2004 | McConnell et al. | 267/195 |
| 2005/0029719 A1 * | 2/2005 | Adoline et al. | 267/70 |

OTHER PUBLICATIONS

New Generation of "Pedestal Steering Column" for Agricultural and Earth Moving Machines; CORAM Group—CORAM Engineering Services, Coram S.P.A.-Engineering and Marketing Division, Via Cefalonia, 70, 25124 Brescia, Italy; 2 pages.

Steering Columns for Off Highway Application; CORAM Group—CORAM Engineering Services, Coram S.p.A-Engineering and Marketing Division, Via Cefalonia, 70, 25124 Brescia, Italy; 2 pages.

* cited by examiner

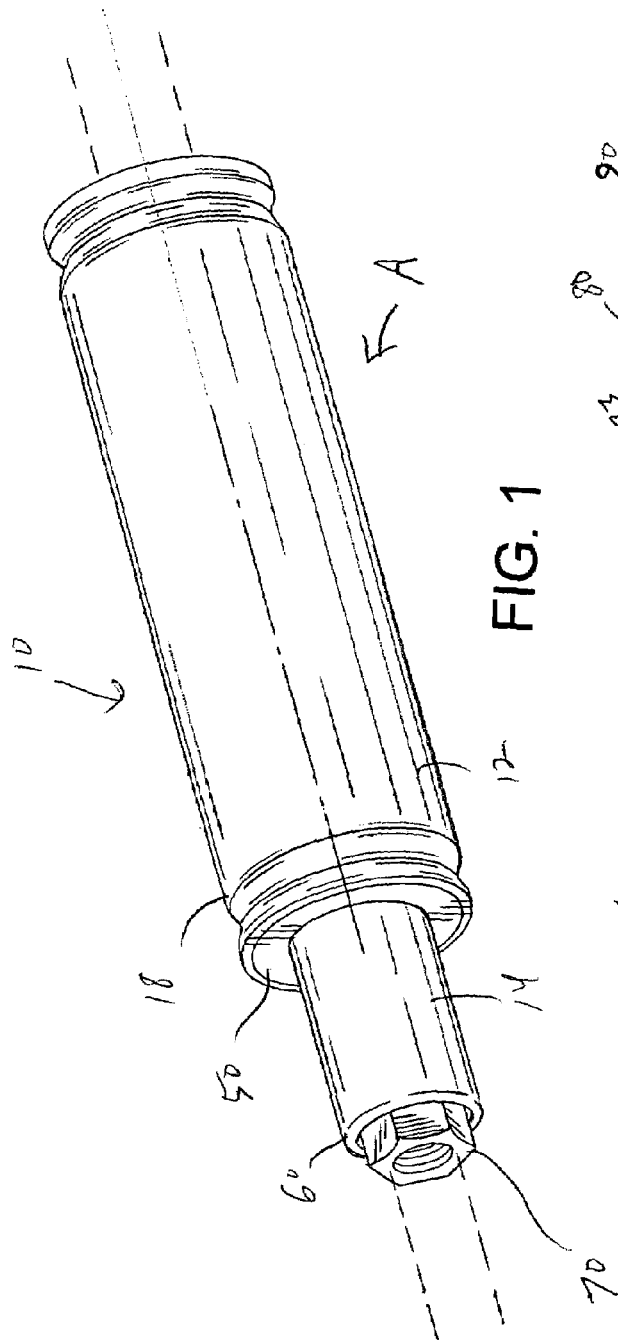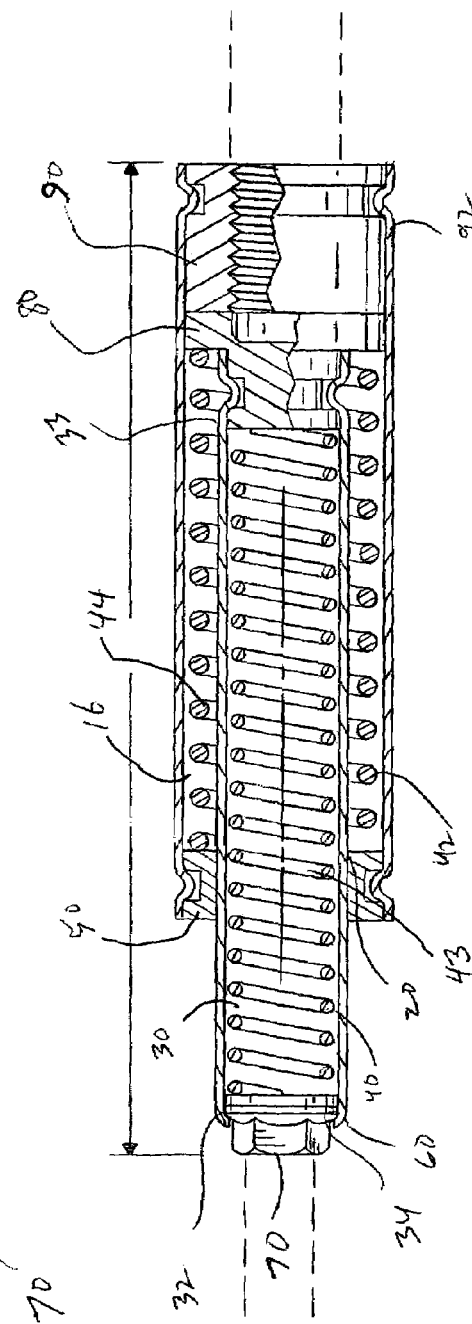

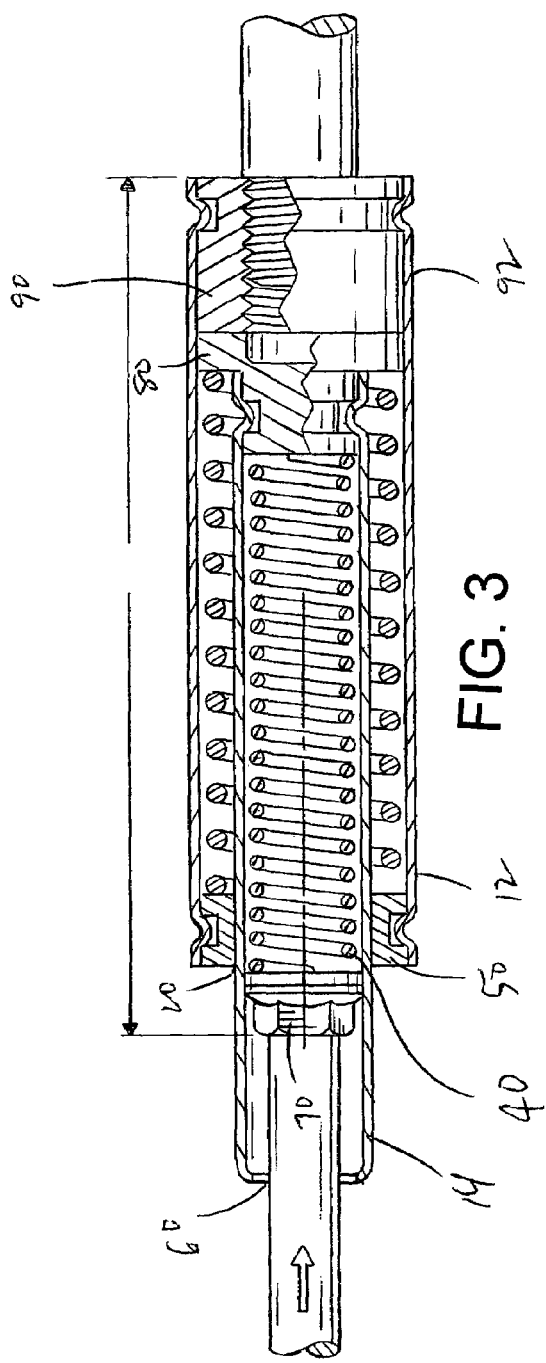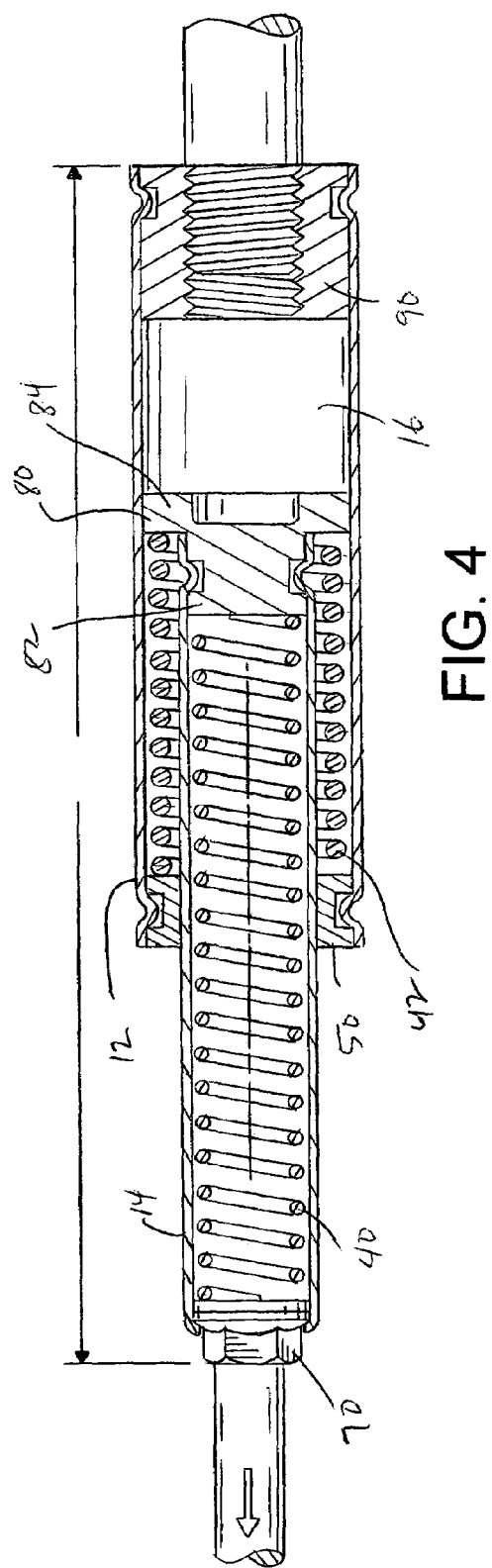

SELF-CENTERING MECHANICAL STRUT

CROSS-REFERENCE TO RELATED APPLICATION

This application claims the benefit of U.S. Provisional Application Ser. No. 60/493,513 filed Aug. 8, 2003.

BACKGROUND OF THE INVENTION

The present invention relates to a mechanical arm strut, and more particularly, to a self-centering mechanical strut.

Gas springs or mechanical struts can be used to assist in the operation of earth-moving equipment, such as small loaders, tractors, excavators, harvesters, etc. The invention provides a self-centering mechanism that can be installed on existing transmission shifter arms for the purpose of imparting a spring return to a shifter arm in response to relative motion out of a predetermined neutral position. The self-centering strut can be used with a hydrostatic transmission such as for an agricultural tractor, a small loader, a harvester, etc. Hydrostatic transmissions tend to creep out of a neutral position unless restrained while the engine continues to run at an operating speed. Thus, the self-centering strut can be added which will exert a return force on the transmission shifter arm whenever it is moved out of neutral back into a neutral position. Such spring return devices typically consist of coaxial outer and inner tube members with elongated helical springs received in annular spaces within the members. When the shifter is in the neutral position, the springs are maintained in a partially compressed state by opposed sets of abutment stops or elements carried by the respective tube members. Longitudinal movement imposed on the tubes in either direction, such as shifting the transmission out of neutral into either forward or reverse gear positions, causes further compression of either spring.

The present invention employs a self-centering device using the mechanical struts and includes coaxial tubular members, springs, and associated stop elements.

SUMMARY OF THE INVENTION

The present invention pertains to a self-centering mechanical strut which overcomes the past deficiencies of such assemblies. The present invention will be described with particular reference to an adjustable mechanical arm strut; however, the invention has a broader application that pertains to any mechanical strut where there is an advantage to have self-centering capabilities.

The self-centering mechanical strut is applied to a linkage system or cable which in turn is connected to a shifter arm of a hydrostatic drive transmission, such as used for an agricultural tractor, small loader, harvester, etc. The arm is shifted between a neutral setting to either opposite or extreme positions such as forward and reverse. The self-centering mechanical strut is used to impose a return force on the shifter arm to return the arm to a neutral position.

In the preferred embodiment, the self-centering strut has outer and inner elongated tubular members which form an annular space between them in which a spring is received. Preferably, the spring is a helical spring. A second helical spring is received within the inner tube. Alternatively the springs could be nested. The first spring rate is preferably selected such that the return force exerted by the spring returns the shifter to a neutral position such that the gear shift mechanism is not forced out of either the forward or reverse setting in which it is placed.

The primary objective of the present invention is to provide a streamlined and more compact version of a mechanical strut with a self-centering spring device to be used in conjunction with transmission shifter arms. Existing devices include bulky housings which are difficult to employ in various environments.

Another object of the present invention is to devise a self-centering mechanical strut which is compact, relatively inexpensive, and reduces the amount of space required for installation thereof.

In accordance with one aspect of the present invention, a self-centering mechanical strut has a first housing member having a first end and a second end. A second housing member has a first end and a second end. The second housing member telescopically receives the first housing member. A first spring assembly is mounted within the first housing member. A second spring assembly is mounted within the second housing member. A first guide member has a first portion which extends into the second end of the first housing member and is fixedly secured thereto. The guide member also has a second portion extending from the first portion into the second housing member. The first spring assembly contacts the first portion of the first guide member and the second spring assembly contacts the second portion of the first guide member. A second guide member extends into the first end of the second housing member. The second guide member has an opening for receiving the first housing member.

In accordance with another aspect of the present invention, a self-centering strut has a first tube housing a first spring assembly and a second tube housing a second spring assembly which telescopically receives the first tube. The first tube has a first plug mounted adjacent a first end of the first spring assembly and a second plug mounted adjacent a second end of the second spring assembly. The second plug extends from an end of the first tube and substantially contacts an inner wall of the second tube. The second tube has a third plug mounted adjacent a first end of the second spring assembly and a fourth plug mounted adjacent a second end of the second spring assembly.

Still other aspects of the invention will become apparent to those skilled in the art upon a reading and understanding of the following detailed specification.

BRIEF DESCRIPTION OF THE DRAWINGS

The foregoing and other objects and advantages will in part be obvious and in part pointed out in the following description taken together with the accompanying drawings in which:

FIG. 1 is a perspective view of the self-centering mechanical strut in accordance with the preferred embodiment of the present invention;

FIG. 2 is a side elevational view in cross section of the strut of FIG. 1;

FIG. 3 is a side elevational view in cross section of the strut of FIG. 1 showing the inner spring in a compressed configuration;

FIG. 4 is a side elevational view in cross section showing the inner tube being pulled out of the outer tube compressing the outer spring of the strut of FIG. 1.

DETAILED DESCRIPTION OF THE PREFERRED EMBODIMENT

Figure 5:
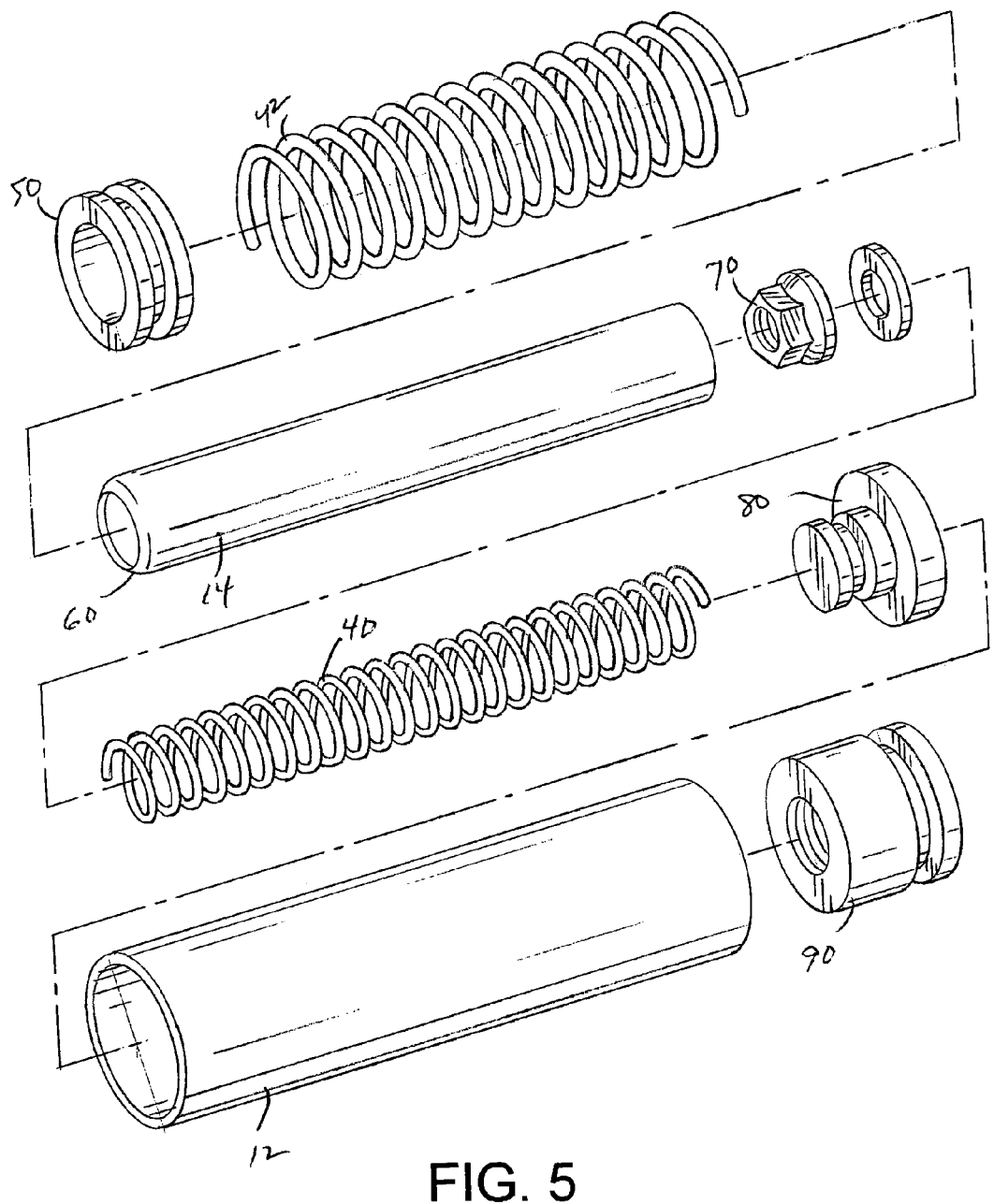
FIG. 5 is an exploded perspective view of the self-centering strut of FIG. 1.

Referring to the drawings, wherein the showings are for the purpose of illustrating the preferred embodiment of the invention only, and not for the purpose of limiting same, FIG. 1 illustrates a self-centering adjustable arm strut A in accordance with the present invention.

Referring to FIG. 1, the mechanical strut includes a protective housing 10 formed by two connective tubes 12, 14. The protective housing is designed to at least partially protect the components of the mechanical strut located inside the housing from damage, dirt or debris, and/or from the ambient elements. The protective housing is also designed to pack the components of the adjustable arm strut located inside the protective housing in a limited area. The protective housing is not designed to provide the principal or primary structural support to the mechanical arm strut for a given load condition; however, the protective housing can be designed to provide some structural support if such support is desired. Materials of the protective housing are not limiting and can include, but are not limited to, plastic, rubber, metal, fiberglass, ceramic, polymer resins, fiber reinforced materials, etc.

Outer tube 12 preferably has a larger diameter than inner tube 14 to enable tube 14 to telescopically be received within a portion of tube 12. The outer surface of tube 12 is substantially smooth; however, this is not required. Referring now to FIG. 2, an inner chamber 16 of the tube 12 has a substantially uniform circular cross-sectional shape; however, other uniform or non-uniform cross sections can be used. Further, the inner surface of the tube 12 is substantially smooth; however, this is also not required. In a first end 18 of the tube there is an opening 20.

Tube 14 has a similar configuration as tube 12. Tube 14 also includes an inner chamber 30 having a first end 32 with an opening 34. Inner chamber 30, like inner chamber 16, has a substantially smooth inner surface; however, this is not required. Furthermore, the inner chamber 30 has a substantially uniform cross-sectional shape; however, other uniform or non-uniform cross-sectional shapes can be used without departing from the scope of the present invention.

In the preferred embodiment of the present invention, the self-centering mechanical strut uses a complex configuration consisting of multiple concentric springs to provide both required compression self-centering functions within the same device in a minimal amount of actual space. Referring again to FIG. 2, positioned within the inner chambers of tubes 12, 14 are elastic elements in the form of inner and outer springs 40, 42, respectively. Each spring 40, 42 includes a plurality of coils 43, 44, respectively. The springs are preferably concentric to each other and are helical springs. Alternatively, the springs can be nested coiled springs. The coils of the spring extend along the longitudinal length of each of the chambers. Each spring has a particular spring rate based upon the load range that the spring is to be exposed to. The number of coils in each spring and the length of the springs are selected depending on the amount of extension desired for the springs and the desired length of the spring. The springs 40, 42 can be made of a number of materials depending on several factors such as, but not limited to, the load to be exerted on the springs, the environment the springs are to be used in, the size, and/or weight of the springs to be used, etc. Typically, the springs are fabricated of metal.

The self-centering function is accomplished by specifically arranging the inner and outer springs in such a manner as to provide forces in opposite directions. Thus, the self-centering strut exerts a return force on the transmission shifter arm whenever it is moved out of neutral back into a neutral position. The spring return devices include coaxial outer and inner tube members with elongated helical springs received in annular spaces within the members. When the shifter is in the neutral position, the springs are maintained in a partially compressed state by opposed sets of abutment stops or elements carried by the respective tube members. Longitudinal movement imposed on the tubes in either direction, such as shifting the transmission out of neutral into either forward or reverse gear positions, causes further compression of either spring.

Specifically, referring now to FIG. 3, the inner spring 40 is preloaded and the smaller tube 14 is piloted in a top guide or third block or plug 50 of the outer tube 12 and extends out of the outer tube at first end opening 20. An exposed, first end 60 of the smaller tube is rolled over a flange nut or first block or plug 70 or any other suitable means of connection to the drive unit (not shown). The nut 70 is shown to be a hexagonal nut; however, other nuts could be used as well. The connector, or flange nut, when compressed exerts an outward force to the drive unit (not shown).

When the flange nut is pulled or extended outwardly as shown in FIG. 4, it pulls on the pre-loaded outer spring 42 via inner guide or second block or plug 80 exerting an inward force away from the drive unit thus compressing spring 42. Spring 40 is extended as the nut is pulled outwardly from housing 14. Springs 40, 42 thus act in conjunction with each other to provide a self-centering function to return the shifter arm to a neutral position.

The inner tube 14 is permanently crimped to the inner guide 80 at a second, inside end 33 of the inner tube which compresses the outer spring 42 when the inner tube is pulled outwardly by the drive unit. Guide 80 has a first portion 82 having substantially the same diameter as tube 14 positioned within end 33 of tube 14 and a second portion 84 which has substantially the same diameter as tube 12 and protrudes from end 33 of tube 14. When released, the outer spring functions to return the inner tube to its neutral position.

Referring to FIG. 3, when the flange nut 70 is compressed into the inner tube, the inner guide 80 pushes the entire inner tube assembly up against a bottom or fourth block or plug 90 which is fixed or crimped into place with respect to a second end 92 of the outer tube 12. The bottom plug is preferably fabricated from threaded stainless steel to mount and align the rear or second end of the strut. Plug 90 has substantially the same diameter as tube 12. When released, the inner spring functions to return the connector or nut to its neutral position. The nut 70 can also be used to adjust the neutral position. By turning the nut, the overall length of the strut can be changed.

These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

The invention claimed is:

1. A self-centering mechanical strut, comprising:
   a first housing member having a first end and a second end;
   a second housing member having a first end and a second end, said second housing member telescopically receives said first housing member;

a first spring assembly mounted within said first housing member;

a second spring assembly mounted within said second housing member;

a first guide plug having a first portion extending into said second end of said first housing member and being fixedly secured thereto, said first guide plug having a second portion extending from said first portion into said second housing member, wherein said first spring assembly contacts said first portion of said first guide plug and said second spring assembly contacts said second portion of said first guide plug; and, a second guide plug extending into said first end of said second housing member, said second guide plug having an opening for receiving said first housing member, wherein when said first housing member is pulled outwardly through said opening of said second guide plug, said second spring assembly is compressed by said second portion of said first guide plug, and said first spring assembly is extended.

2. The self-centering mechanical strut of claim 1, further comprising a third plug received within said second end of said second housing member, wherein said first guide plug slides within said second housing member between said third plug and said second guide plug.

3. The self-centering mechanical strut of claim 1, further comprising a connection member attached to said first end of said first housing member for connecting said strut to an associated drive unit.

4. The self-centering mechanical strut of claim 3, wherein said connection member comprises a nut.

5. The self-centering mechanical strut of claim 2, wherein said third plug comprises an opening for receiving said first housing member.

6. The self-centering mechanical strut of claim 1, wherein said second housing member comprises a tube having an inner chamber for receiving said first housing member.

7. The self-centering mechanical strut of claim 6, wherein said first housing member comprises a tube.

8. The self-centering mechanical strut of claim 1, wherein said first spring assembly comprises a single, continuous spring.

9. The self-centering mechanical strut of claim 1, wherein said second spring assembly comprises a single, continuous spring.

10. The self-centering mechanical strut of claim 7, wherein said first housing member comprises an inner chamber for receiving said first spring assembly.

11. The self-centering mechanical strut of claim 1, wherein said second spring assembly surrounds said first housing member.

12. The self-centering mechanical strut of claim 1, wherein said first spring assembly and said second spring assembly are concentric with each other.

13. The self-centering mechanical strut of claim 1, wherein said first housing member and said second housing member are concentric with each other.

14. The self-centering mechanical strut of claim 1, wherein when said first housing member is pushed inwardly toward said second housing member, said first spring assembly is compressed, and said second spring assembly is extended.

15. A self-centering strut, comprising:
a first tube housing a first spring assembly;
a second tube housing a second spring assembly and which telescopically receives said first tube;
said first tube comprises a first plug mounted adjacent a second end of said first spring assembly, wherein said first plug extends from an end of said first tube and substantially contacts an inner wall of said second tube;
said second tube comprises a second plug mounted adjacent a first end of said second spring assembly and a third plug mounted adjacent a second end of said second spring assembly, wherein when said first tube is pushed into said second tube, said first spring assembly is compressed by said first plug of said first tube as said first plug comes into contact with said third plug and said second spring assembly is extended between said second and third plugs.

16. The self-centering strut of claim 15, wherein said first spring assembly comprises a single, continuous spring.

17. The self-centering strut of claim 15, wherein said second spring assembly comprises a single, continuous spring.

18. The self-centering strut of claim 15, wherein said second spring tube comprises an inner chamber for receiving said second spring assembly.

19. The self-centering strut of claim 15, wherein said first tube comprises an inner chamber for receiving said first spring assembly.

20. The self-centering strut of claim 15, wherein said second spring assembly surrounds said first tube.

21. The self-centering strut of claim 15, wherein said first spring assembly and said second spring assembly are concentric with each other.

22. The self-centering strut of claim 15, wherein said first tube and said second tube are concentric with each other.

23. The self-centering strut of claim 22, wherein when said first tube is pulled outwardly from the second tube, said second spring assembly is compressed and said first spring assembly is extended.

24. A self-centering strut, comprising:
a first tube housing a first spring assembly;
a second tube housing a second spring assembly and which telescopically receives said first tube;
said first tube comprises a first guide member mounted adjacent one end of said first tube;
said second tube comprises a second guide member mounted adjacent one end of said second tube and a third guide member mounted adjacent an opposite end of said second tube, wherein said first tube has a fourth guide member mounted adjacent an opposite end of said first tube, wherein when said first tube is pulled outwardly, said first spring assembly is extended between said first guide member and said fourth guide member, and said second spring assembly is compressed between said second guide member and said third guide member.

25. The self-centering strut of claim 24, wherein said first spring assembly comprises a single, continuous spring.

26. The self-centering strut of claim 24, wherein said second spring assembly comprises a single, continuous spring.

27. The self-centering strut of claim 24, wherein said second tube comprises an inner chamber for receiving said second spring assembly.

28. The self-centering strut of claim 24, wherein said first tube comprises an inner chamber for receiving said first spring assembly.

29. The self-centering strut of claim 24, wherein said second spring assembly surrounds said first tube.

30. The self-centering strut of claim 24, wherein said first spring assembly and said second spring assembly are concentric with each other.

31. The self-centering strut of claim 24, wherein said first tube and said second tube are concentric with each other.

32. The self-centering strut of claim 24, wherein when said first tube is pushed inwardly toward said second tube, said first spring assembly is compressed between said first guide member and said fourth guide member and said second spring assembly is extended between said second guide member and said third guide member.

33. The self-centering strut of claim 24, wherein said first guide member extends from said second end of said first tube and substantially contacts an inner wall of said second tube.

* * * * *